(12) United States Patent
Cam

(10) Patent No.: US 11,879,738 B2
(45) Date of Patent: Jan. 23, 2024

(54) CONTROL OF A MOTOR VEHICLE

(71) Applicant: Bayerische Motoren Werke Aktiengesellschaft

(72) Inventor: Önder Cam, Berlin (DE)

(73) Assignee: Bayerische Motorenwerke Aktiengesellschaft, Munich (DE)

(*) Notice: Subject to any disclaimer, the term of this patent is extended or adjusted under 35 U.S.C. 154(b) by 92 days.

(21) Appl. No.: 17/058,122

(22) PCT Filed: May 3, 2019

(86) PCT No.: PCT/DE2019/100399
§ 371 (c)(1),
(2) Date: Nov. 23, 2020

(87) PCT Pub. No.: WO2019/223833
PCT Pub. Date: Nov. 28, 2019

(65) Prior Publication Data
US 2021/0199448 A1    Jul. 1, 2021

(30) Foreign Application Priority Data

May 24, 2018  (DE) .......................... 102018208207.3

(51) Int. Cl.
*G01C 21/34*  (2006.01)
*G01C 21/32*  (2006.01)
(Continued)

(52) U.S. Cl.
CPC ......... *G01C 21/3415* (2013.01); *B60W 40/10* (2013.01); *B60W 60/00272* (2020.02); *G01C 21/32* (2013.01); *G01C 21/3602* (2013.01)

(58) Field of Classification Search
None
See application file for complete search history.

(56) References Cited

U.S. PATENT DOCUMENTS

2003/0078720 A1* 4/2003 Adachi .................. G01C 21/30
                                                              701/446
2009/0015596 A1   1/2009 Fuchs et al.
(Continued)

FOREIGN PATENT DOCUMENTS

DE   102008046683 A1   3/2009
DE   102015000856 A1   7/2016
(Continued)

OTHER PUBLICATIONS

Machine translation of EP-0987519-B1 (Year: 2000).*
Machine translation of JP-2007249407-A (Year: 2007).*

*Primary Examiner* — Anne Marie Antonucci
*Assistant Examiner* — Kyle S Park
(74) *Attorney, Agent, or Firm* — 2SPL Patentanwälte PartG mbB; Kieran O'Leary

(57) ABSTRACT

Embodiments relate to a method and apparatus for controlling a motor vehicle. The method comprises the steps of detecting a first trajectory of a first motor vehicle while traveling a predetermined route; determining a course of the predetermined route based on predetermined map data; determining a quality to which the trajectory and the course correspond; and transmitting the quality to a second motor vehicle. On board a second motor vehicle, a course of a predetermined route may be determined on the basis of predetermined map data; a quality associated with the course may be detected; an environment of the second motor vehicle may be scanned; a second trajectory may be determined by merging the course with the scan; and the second motor vehicle may be controlled to follow the second trajectory.

9 Claims, 3 Drawing Sheets

(51) Int. Cl.
    *B60W 40/10*     (2012.01)
    *G01C 21/36*     (2006.01)
    *B60W 60/00*     (2020.01)

(56) References Cited

U.S. PATENT DOCUMENTS

| | | |
|---|---|---|
| 2012/0245817 A1 | 9/2012 | Cooprider et al. |
| 2014/0088855 A1* | 3/2014 | Ferguson ............... G01C 21/32 701/117 |
| 2016/0091324 A1* | 3/2016 | Horihata ......... G08G 1/096811 701/417 |
| 2017/0166207 A1* | 6/2017 | Darms ................ B60W 30/165 |
| 2017/0168505 A1* | 6/2017 | Meinecke ............ G05D 1/0295 |
| 2019/0196472 A1* | 6/2019 | Körner ................ G05D 1/0214 |
| 2019/0315350 A1* | 10/2019 | Oguro ..................... G05D 1/02 |
| 2020/0317193 A1* | 10/2020 | Ueda ..................... B60W 30/10 |

FOREIGN PATENT DOCUMENTS

| | | |
|---|---|---|
| DE | 102015014651 A1 | 5/2017 |
| DE | 102015225238 A1 | 6/2017 |
| DE | 102016210745 A1 | 12/2017 |
| DE | 102016216335 A1 | 3/2018 |
| EP | 0987519 B1 * | 3/2000 |
| EP | 3141867 A2 | 3/2018 |
| JP | 2007249407 A * | 9/2007 |

\* cited by examiner

CONTROL OF A MOTOR VEHICLE

CROSS-REFERENCE TO RELATED APPLICATIONS

This application is a 35 U.S.C. § 371(c) national stage entry of PCT/DE2019/100399, filed on May 3, 2019. That application claimed priority to German Application 10 2018 208 207.3, filed on May 24, 2018. The contents of the earlier filed applications are incorporated by reference herein in their entirety.

FIELD

The invention relates to the control of a motor vehicle. In particular, the invention relates to the control of a motor vehicle in a transverse direction in order to maintain a predetermined lane.

BACKGROUND

A motor vehicle may include a lane departure warning system configured to keep the motor vehicle in a designated lane. This may prevent the motor vehicle from colliding with an object or another motor vehicle, which may be to the right or left of the lane. The lane departure warning system usually scans a motor vehicle's surroundings and determines a trajectory to follow in order to keep the motor vehicle within the lane. However, the scanning may be of any difficulty, for example if existing light conditions make optical scanning more difficult, a lane marking is missing in sections or a busy lane leads over an upcoming hilltop. In some cases, the trajectory may then not be determined or may not be determined reliably, so that the lane departure warning system may not be able to offer any safety gain.

The trajectory might be determined in an improved way on the basis of map data, but for this purpose highly accurate and up-to-date map data are useful, which may not be available on board the motor vehicle. Less accurate or up-to-date map data may be obtained, for example, from a navigation system on board the motor vehicle, but it is not possible to make a general assessment of whether or not the course of a route corresponds to an actual course of the route according to the map data. The use of grossly incorrect map data may deteriorate a determination result for the trajectory.

One of the objects underlying the invention is to indicate an improved technique for controlling the motor vehicle. The invention solves this object by means of the subject matters of the independent claims. Subclaims represent preferred embodiments.

SUMMARY

According to a first aspect of the invention, a first method comprises the steps of detecting a first trajectory of a first motor vehicle while traveling a predetermined route; determining a course of the route based on predetermined map data; determining a quality to which the trajectory and the course correspond; and transmitting the quality to a second motor vehicle.

On the basis of the quality it may be assessed whether the map data may be approved for a certain use or not. The use may in particular include the control of a second motor vehicle on the route. The quality may be provided by the first motor vehicle, by the second motor vehicle or by a central location, which is preferably not mobile. For example, motor vehicles may communicate wirelessly with the central location.

Preferably, a plurality of first trajectories of first motor vehicles is detected, wherein the quality is determined with respect to the plurality of trajectories. The determination may be made permanently. In this way, position information from a fleet of first motor vehicles may be used to improve the control of the second motor vehicle. The second motor vehicle may determine its trajectory as it travels the route and provide it as the first motor vehicle, so that the course of the route may be consolidated or more heavily weighted when the technology is applied again.

The quality may be determined with respect to first trajectories that were detected when travelling the route within a predetermined, past time period. In other words, a quality may only be determined with respect to first trajectories that are not older than a pre-determined age. This maximum age may be predetermined in hours, days, weeks or months. This may prevent a change in the route, for example due to construction work or a broken down vehicle, from being ignored for a longer period of time.

A distance may be determined between the first trajectory and the course, wherein the smaller the distance, the higher the quality. If the distance is zero, the quality may be maximum. The distance may be summed up or integrated over a length of the route to determine the quality with respect to the entire route. The distance may also be summed up in squares, for example, to take due account of short deviations.

The first trajectory may include a number of positions of the first motor vehicle, where the higher a density of positions of first motor vehicles, the higher the quality. The more first motor vehicles provide their positions, the more first trajectories may be determined and the higher the density of positions at one location of the route may be. As a result, the course of the route may be assessed with greater certainty, which may be reflected in increased quality.

The route may be determined as a series of positions, in particular positions defined at equal intervals over time. The quality may be all the lower, the stronger a curvature of the route at the same density of positions. This makes it possible to take into account that the route must be known particularly precisely, especially in the area of a strong curvature, in order to be able to carry out safe control. A small number of positions per travel distance may be sufficient on a straight route; however, as the curvature increases, more and more positions per travel distance may be required in order to correctly map or assess the actual course. Thus, on the basis of only a few pieces of trajectory information, a high quality on a weakly curved section of a route may be determined, but a low quality on a strongly curved section of the route. The map data may be used in the weakly curved section of the route to control another motor vehicle, but not in the strongly curved section.

According to a second aspect of the invention, a second method comprises the steps of determining a course of a route on the basis of predetermined map data; detecting a quality assigned to the course; scanning an environment of a second motor vehicle; determining a second trajectory by merging the course with the scanning; and controlling the second motor vehicle to follow the second trajectory.

The second method may work in particular with the quality determined by the first method. The second motor vehicle may be better controlled on the basis of the locally available map data, if these are assigned sufficiently high qualities. Only incorrect or inaccurate map data may be disregarded for the control of the second motor vehicle.

It is preferable to weight the course when merging depending on the quality assigned to the course. A course with a high quality may thus be weighted more strongly than a course with a low quality. This allows the merging to be carried out dynamically with regard to qualities that change over the length of the route.

The second trajectory may only be determined on the basis of the course if the assigned quality reaches a predetermined level. If the determined quality falls below the predetermined level, an improvement of the determination result may not be guaranteed by including the map data. Discarding such map data when merging may ensure the driving safety of the second motor vehicle.

According to another aspect of the invention, a control apparatus for a second motor vehicle comprises a data storage for map data relating to a course of a route; a receiving device for receiving a quality associated with the course; a scanning device for scanning an environment of the second motor vehicle; and a processing device configured to determine a second trajectory by merging the course with the scan; and a control apparatus for controlling the second motor vehicle to follow the second trajectory. A motor vehicle, in particular a passenger vehicle, may include the control apparatus.

A central device comprises a receiving device for receiving a first trajectory of a first motor vehicle while traveling a predetermined route; a processing device for determining a course of the route based on predetermined map data and for determining a quality to which the trajectory and the course correspond;

a transmitting device for transmitting the quality to a second motor vehicle. The receiving device and the transmitting device may be configured integrated with each other. Preferably, the central device is realized as a server or service in a cloud.

One of the processing devices referred to herein may be configured to carry out, in whole or in part, one of the methods described herein. For this purpose, the processing device may include a programmable microcomputer or microcontroller and the method may be in the form of a computer program product with program code means. The computer program product may also be stored on a computer-readable data carrier. Features or advantages of the methods, the apparatus and the central device described herein may be transferred among each other.

BRIEF DESCRIPTION OF THE FIGURES

The invention is now described in more detail with reference to the attached drawings in which.

DETAILED DESCRIPTION

Figure 1:
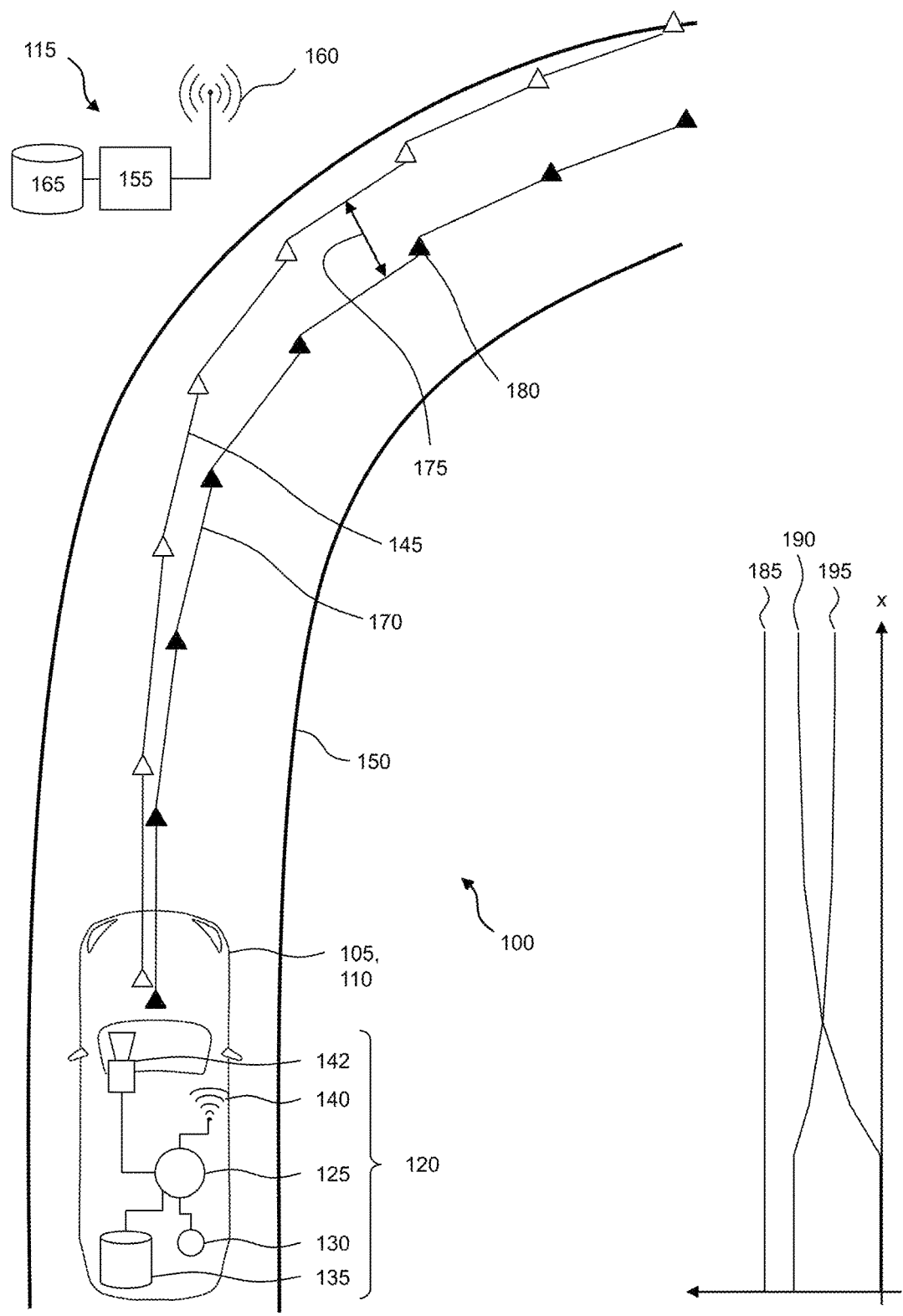
FIG. 1 illustrates a system and
FIG. 2 illustrates a flow chart of a method.

FIG. 1 shows a system 100 with a first motor vehicle 105, a second motor vehicle 110 and an optional central location 115. The first and second motor vehicles 105, 110 are shown here as only one vehicle, since their equipment is largely similar and the second motor vehicle 110 may also be regarded as the first motor vehicle 105 for the purposes of the technology presented here.

On board the first motor vehicle 105 an apparatus 120 including a processing device 125, a positioning device 130 and a communication device 140 is preferably attached. A corresponding apparatus 115 is preferably attached on board the second motor vehicle 110, which additionally includes a data storage 135 for map data and at least one sensor 142 for scanning an environment. For the second motor vehicle 110, the positioning device 130 may also be omitted if the second motor vehicle 110 is not also to be used as the first motor vehicle 105.

The data storage 135 may be part of a navigation system of the motor vehicle 105, 110 and preferably includes map data containing a course 145 of a route 150 which the motor vehicle 105, 110 travels. The positioning device 130 may in particular comprise a receiver for navigation signals from a satellite-based navigation system. However, other sensors are also possible, for example an inertial system, an odometer or a position sensor. The positioning device 130 preferably provides a position at which the motor vehicle 105, 110 is currently located. Additionally, a speed, a direction of movement and/or an acceleration may be provided.

The sensor 142 may, for example, comprise one or more optical cameras, a radar sensor or a lidar sensor and is configured to scan the surroundings of the second motor vehicle 110 without contact. On the basis of scanned sensor data, the processing device 125 may carry out or initiate control of the second motor vehicle 110 in such a way that the second motor vehicle is kept as safely as possible in a lane that follows the route 150. The communication device 140 is preferably set up for wireless communication and may include a transmit device and/or a receiving device. Communication is usually carried out via a mobile radio network and may use one or more other networks, such as the Internet or a private network.

The central location 115 preferably comprises a processing device 155, which may be connected to a communication device 160 and/or a data storage 165. The communication device 160 is preferably configured for communication with at least one of the motor vehicles 105, 110 and may be wireless or wired. The data storage 165 may be configured to store a plurality of trajectories as described in more detail below. In addition, preferably map data is stored in the data storage 165 which correspond to the map data in the data storage 135 of the second motor vehicle 110. The processing device 155 is preferably configured to process trajectories and the map data.

It is proposed that the first motor vehicle 105 records a first trajectory 170 when driving along the route 150, which may be compared with the course 145 of the route 150 according to the map data in the data storages 135, 165. It is assumed that the first motor vehicle 105 correctly travels along route 150, i.e. follows the route 150 without leaving it, remains on an assigned side of the road (right for right-hand traffic, left for left-hand traffic) and does not leave an assigned lane, if provided. Since this assessment is unrealistic, first trajectories 170 of a plurality of first motor vehicles 105 may be processed in a similar way, so that deviations from the assumption may be omitted on average. The greater the number of first trajectories 170 of different first motor vehicles 110, the better the assumption may be met on average. In the following, for a simpler explanation, initially only one first trajectory 170 is assumed.

Then it is determined how well the first trajectory 170 follows the course 145 of the route 150. A measure of the quality of the tracking may be given as quality. The determination may be made on board the first motor vehicle 105 if the same has the corresponding map data available. Preferably, however, the first trajectory 170 is transmitted to the central location 115 and assessed there. In particular, the determination may take into account how large a distance 175 is between the course 145 and the first trajectory 170. The larger the distance 175, the less well the first trajectory 170 follows the first course 145 and the lower the determined quality may be. The distance 175 used to form the quality may be considered over the length of the route 150 and may, for example, relate to a maximum specific distance 175 or an integral of the distance 175 over the length of the route 150.

The first trajectory 170 may be defined as a series of positions 180, indicated in FIG. 1 by dark triangles. The closer the positions 180 are to each other in a section of the route 150, the higher the quality in this section may be determined. This is based on the consideration that individual measurement errors or deviations from the assumption formulated above are less significant when information from several first trajectories 170 is taken into account.

In the right-hand area of FIG. 1, exemplary courses of characteristic numbers along a length x of the illustrated route 150 are shown. A first course 185 concerns the local density of positions 180, which is exemplarily constant in the present example. A second course 190 concerns a curvature in the route 150. The curvature is initially zero and gradually increases along the length x of the route 150. The greater the curvature, the greater the steering angle of a motor vehicle 105, 110 has to be selected in order for it not to leave the route 150. At the same time, the effect of a deviation of the steering angle from a correct steering angle also increases with an increasing curvature of the route 150. In the area of a strongly curved route 150 there is therefore an increased need for map information that is as accurate as possible or for a reliable statement on the reliability of the existing map information. It is therefore proposed that the greater the curvature of the route 150, the smaller the quality should be determined. A third course 195 shows this connection.

Particularly preferred is the division of the density by the curvature, and forming the quality as a function of the resulting factor. A high factor may result in high quality and a low factor in low quality. For example, a high density of positions in the area of a strong curvature may still result in an acceptable quality.

The determined quality assigned to a route 150 is then transmitted to the second motor vehicle 110, which, depending on the quality, may additionally use the map information of the data storage 135 to determine a second trajectory (not shown). The second trajectory runs ideally along the route 150 in such a way that the second motor vehicle 110 may follow it, without leaving the route 150 or any lane assigned to the same, if same is given. In addition, the second motor vehicle 110 may remain on a side of the route 150 assigned to it, as described above also as an assumption for the first trajectory 170. Further data sources for the determination of the second trajectory may be the sensor(s) 142 with whose sensor data the map information in the data storage 135 may be merged. It is not recommended to base a determination of the second trajectory completely on the map data without current sensor data from the environment of the second motor vehicle 110.

If the quality is high, the influence of the map data on the determined second trajectory may be large, if the quality is low, its influence may be smaller. In one embodiment, map data whose assigned quality is below a predetermined threshold value is ignored. The second motor vehicle 110 may then be controlled to follow the determined second trajectory. For example, a steering angle of the second motor vehicle 110 may be actively influenced.

Figure 2:
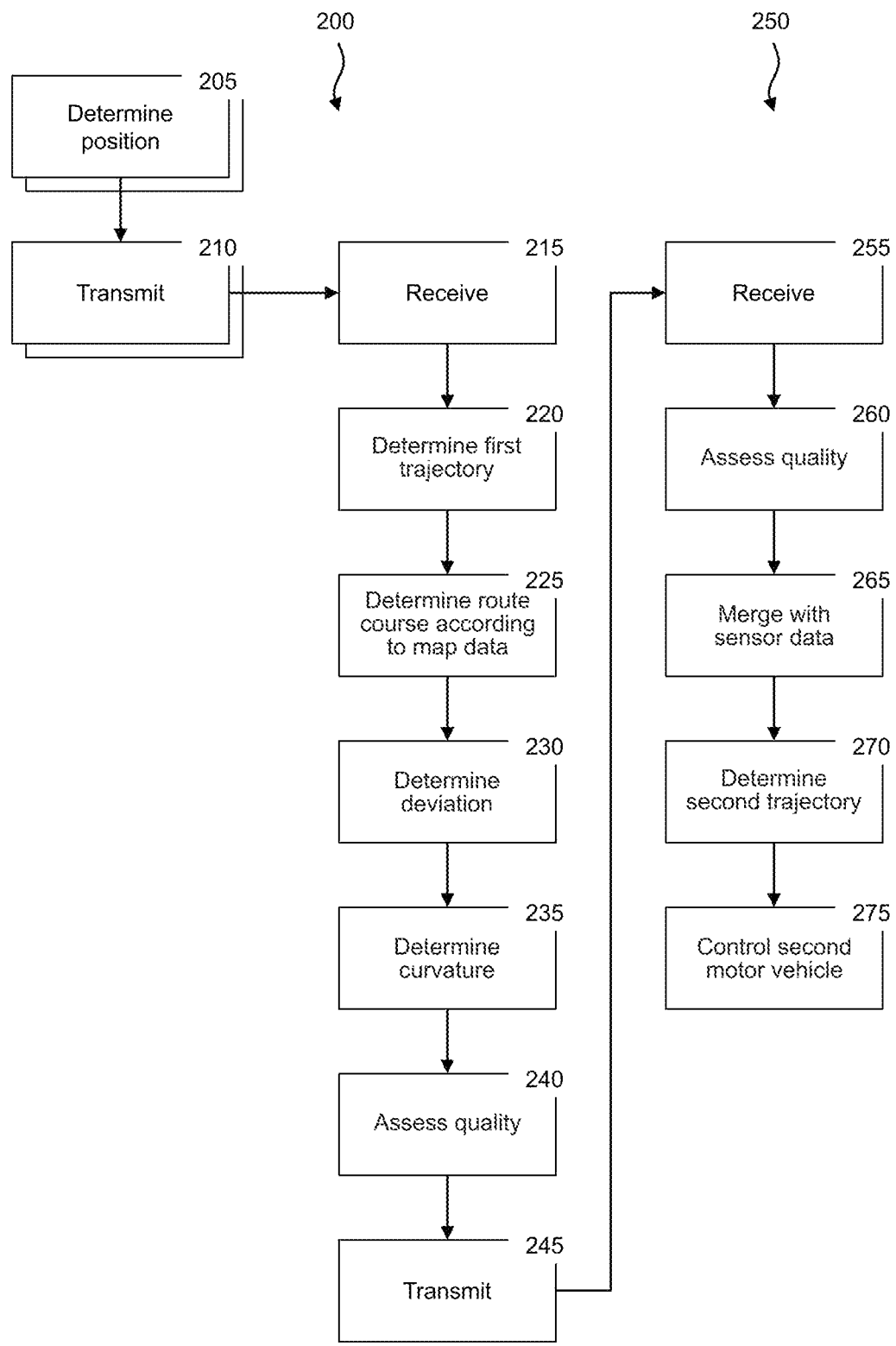
Figure 3:
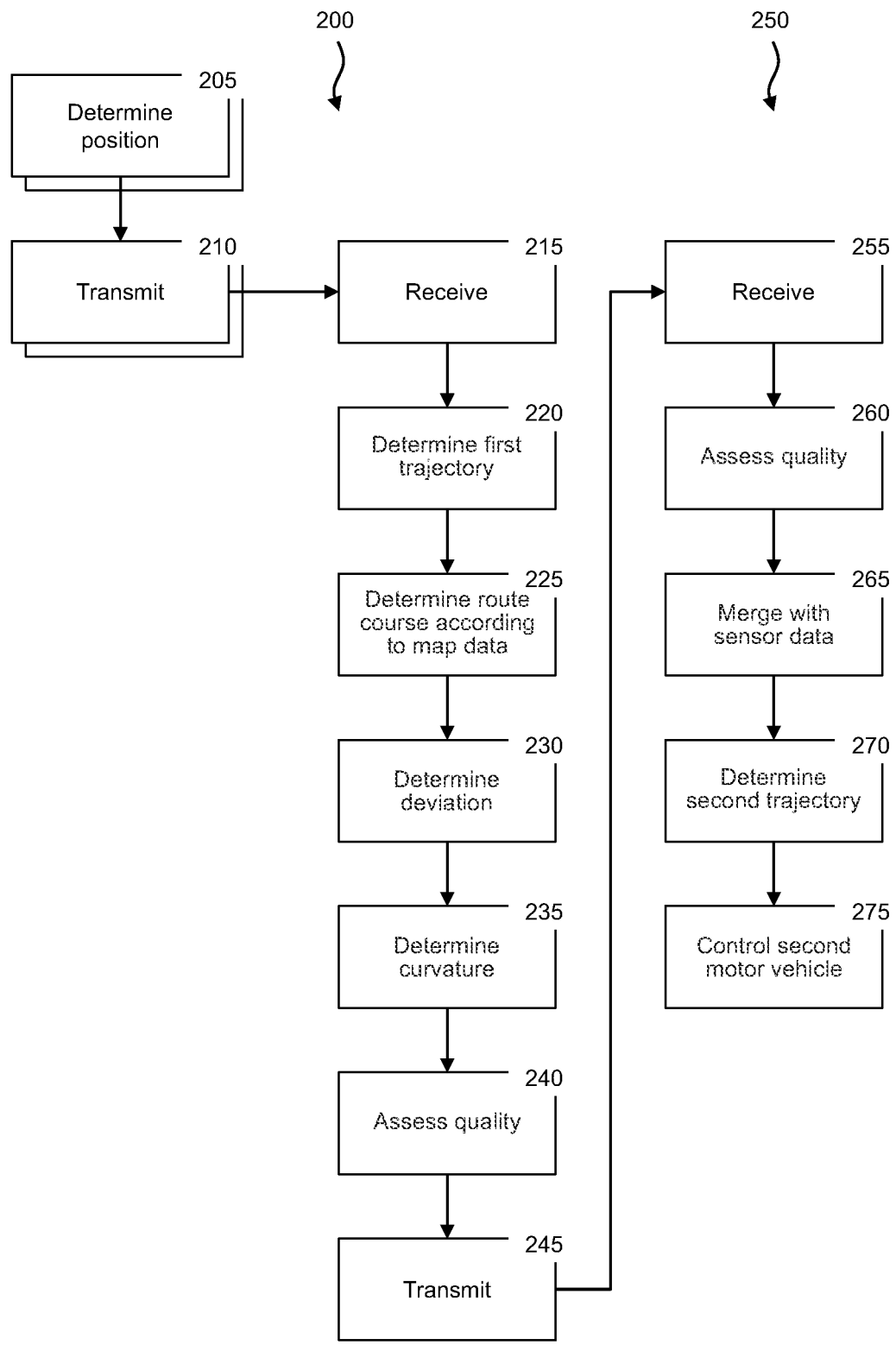

FIG. 2 shows a flow chart of a first method 200 and a second method 250. The methods 200, 250 are preferably executed in connection with a system 100. Individual parts of the methods 200, 250 may be performed at different locations. The representation of FIG. 2 is based on a preferred division in which steps of the methods 200, 250 shown in a left-hand area are performed on board the first motor vehicle 105, steps shown in a middle area are performed by the central location 115 and steps shown in a right-hand area are performed by the second motor vehicle 110.

In a step 205, a position 180 of the first motor vehicle 105 may be determined, which may be transmitted to the central location 115 in a step 210. Steps 205 and 210 are preferably performed continuously. Further preferably, several first motor vehicles 105 are provided which may perform steps 205 and 210 independently of each other.

The central location 115 may receive the positions 180 in a step 215 and determine the first trajectory 170 in a step 220. In a step 225 the course 145 of the route 150 may be determined according to map information. Quantization of the first trajectory 170 and the course 145 into individual positions may be treated by forming continuous curves each.

Then the quality with which the first trajectory 170 follows the course 145 or vice versa may be determined. For this purpose, a deviation 175 between the curves may be determined in a step 230. In a step 235, a density of positions in the area of the route 150 and/or a curvature of the route 150 may be determined. On the basis of at least one of these parameters, the quality is then determined in a step 240, as described in more detail above.

In a step 245 the quality assigned to the route 250 may be transmitted to the first vehicle 105, which may receive the quality in a step 255. In a step 260 the quality may then be assessed. If it is below a predetermined threshold value, for example, further processing may be omitted. Otherwise, a merging of map information of the route 150, in particular the course 145, with sensor data of the second motor vehicle 110 may be carried out in a step 265. The higher the quality determined, the more the course 145 may be taken into account.

Based on the merged data, a second trajectory may be determined in a step 270 and the second motor vehicle 110 may be controlled in a step 275 so as to follow the second trajectory.

REFERENCE NUMERALS

100 System
105 First motor vehicle
110 Second motor vehicle
115 Central location
120 Apparatus
125 Processing device
130 Positioning device
135 Data storage
140 Communication device
142 Sensor
145 Course
150 Route
155 Processing device
160 Data storage
165 Communication device
170 First trajectory
175 Distance
180 Position
185 First course: density 190 Second course: curvature
195 Third course: quality
200 Method
205 Determine position of first motor vehicle
210 Transmit
215 Receive
220 Determine first trajectory
225 Determine course of the route according to map data
230 Determine deviation of first trajectory from route
235 Determine curvature, density
240 Determine quality
245 Transmit
250 Method
255 Receive
260 Assess quality
265 Merge with sensor data
270 Determine second trajectory
275 Control second motor vehicle

The invention claimed is:

1. A method for controlling a second motor vehicle based on an assessed quality of a map data for a predetermined route traveled by a first motor vehicle, the first motor vehicle comprising a positioning device and a wireless communication device, the method comprising the following steps:
recording a first trajectory via the positioning device of the first motor vehicle while traveling the predetermined route,
wherein the first trajectory comprises a number of positions of the first motor vehicle while traveling the predetermined route,
wherein each position of the number of positions is detected by the positioning device of the first motor vehicle;
determining a course of the predetermined route on the basis of the map data;
determining a density of the number of positions of the first trajectory along the predetermined route;
determining a strength of a curvature of the first trajectory along the predetermined route;
determining the quality to which the first trajectory and the course correspond,
wherein the quality increases as the density of the number of positions of the first trajectory increases, and
wherein the quality decreases as the strength of the curvature of the predetermined route increases compared to the density of the number of positions of the first trajectory along the predetermined route; and
transmitting the quality of the map data for the predetermined route to the second motor vehicle via the wireless communication device,
controlling the second motor vehicle along a second trajectory via an apparatus, wherein the second trajectory is based on the quality of the map data for the predetermined route that is received from the first motor vehicle.

2. The method according to claim 1, wherein the first motor vehicle is one of a plurality of motor vehicles, wherein a plurality of the first trajectories of each of the plurality of motor vehicles are recorded and the quality is determined with respect to the plurality of the first trajectories and the course of the predetermined route.

3. The method according to claim 2, wherein the quality is determined with respect to the plurality of the first trajectories which were recorded when traveling the predetermined route within a predetermined past time period.

4. The method according to claim 1, further comprising determining a distance between the first trajectory and the course,
wherein the quality increases as the distance between the first trajectory and the course decreases.

5. The method of claim 1 wherein the positioning device comprises a receiver for navigation signals from a satellite-based navigation system, wherein the positioning device determines each position of the number of positions based on the received navigation signals.

6. The method of claim 1, wherein the second motor vehicle comprises at least one sensor configured to scan surroundings of the second motor vehicle while traveling the predetermined route, and wherein the apparatus of the second motor vehicle determines the second trajectory by merging data from the at least one sensor with the map data based on the received quality of the map data.

7. A system for controlling a second motor vehicle based on an assessed quality of a map data for a predetermined route traveled by a first motor vehicle, the first motor vehicle comprising:
a positioning device for recording a first trajectory of the first motor vehicle while traveling the predetermined route,
wherein the first trajectory comprises a number of positions of the first motor vehicle while traveling the predetermined route,
wherein each position of the number of positions is detected by the positioning device of the first motor vehicle;
a processor for:
determining a course of the predetermined route based on the map data;
determining a density of the number of positions of the first trajectory along the predetermined route;
determining a strength of a curvature of the first trajectory along the predetermined route;
determining the quality to which the first trajectory and the course correspond,
wherein the quality increases as the density of the number of positions of the first trajectory increases, and
wherein the quality decreases as the strength of the curvature of the predetermined route increases compared to the density of the number of positions of the first trajectory along the predetermined route; and
a wireless communication device for transmitting the quality of the map data for the predetermined route to a second motor vehicle,
the second motor vehicle comprising:
a wireless communication device for receiving the quality of the map data for the predetermined route, and
a processor for controlling the second motor vehicle along a second trajectory, wherein the second trajectory is based on the quality of the map data received from the first motor vehicle.

8. The system of claim 7 wherein the positioning device comprises a receiver for navigation signals from a satellite-based navigation system, wherein the positioning device determines each position of the number of positions based on the received navigation signals.

9. The system of claim 7, wherein the second motor vehicle comprises at least one sensor configured to scan surroundings of the second motor vehicle while traveling the predetermined route, and wherein the processor of the second motor vehicle determines the second trajectory by merging data from the at least one sensor with the map data based on the received quality of the map data.

* * * * *